July 21, 1931. F. LAWACZECK 1,815,410
PROCESS AND MEANS FOR PRODUCING AMMONIA
Filed March 26, 1925    3 Sheets-Sheet 1

Inventor:
Franz Lawaczeck
by [signature]
Atty.

July 21, 1931. F. LAWACZECK 1,815,410
PROCESS AND MEANS FOR PRODUCING AMMONIA
Filed March 26, 1925 3 Sheets-Sheet 3
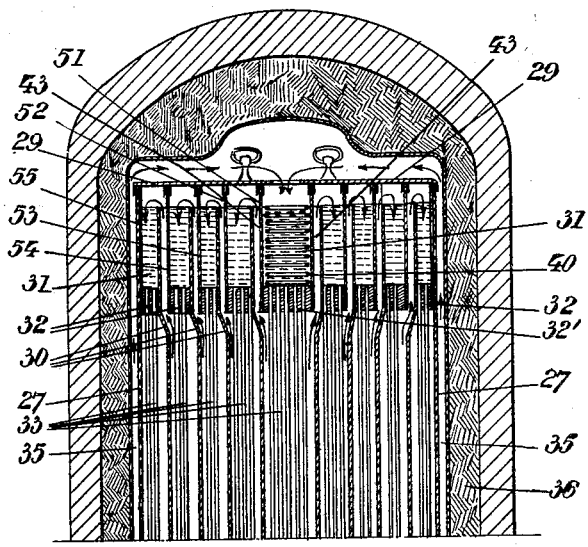
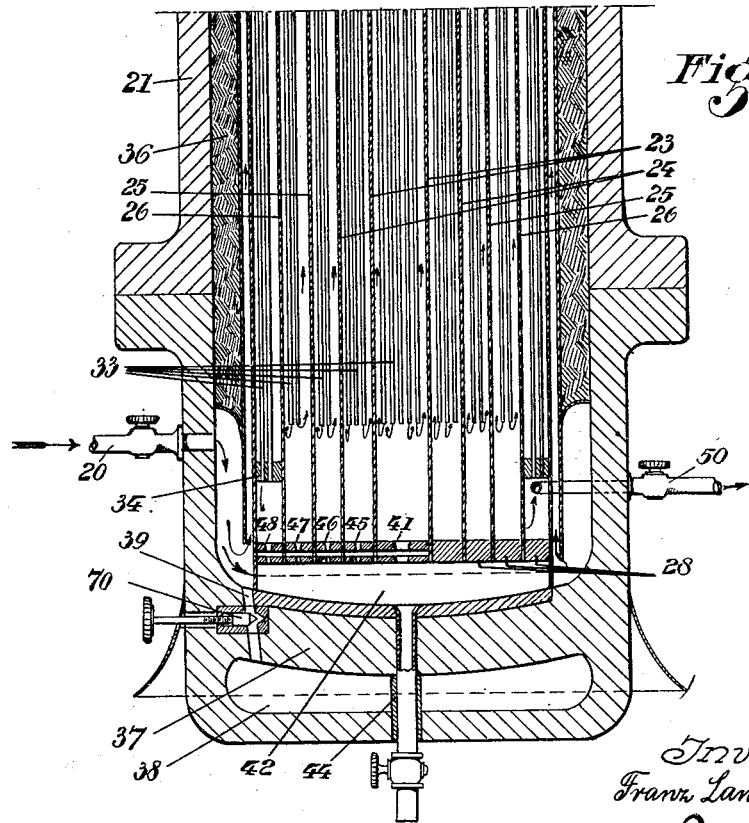
Fig. 3.
Inventor:
Franz Lawaczeck
by [signature]
Atty.

Patented July 21, 1931

1,815,410

UNITED STATES PATENT OFFICE

FRANZ LAWACZECK, OF MUNICH, GERMANY

PROCESS AND MEANS FOR PRODUCING AMMONIA

Application filed March 26, 1925, Serial No. 18,619, and in Germany December 13, 1923.

My invention refers to the production of ammonia and more especially to a process and means for producing ammonia by passing hydrogen and nitrogen over a catalytic agent, thereby effecting their synthetic combination.

In the processes hitherto proposed for the production of ammonia in the above mentioned manner means had to be employed for producing and maintaining by compression the high pressure required in order to effect the synthesis of ammonia. However, the use of compressors in this process involves serious drawbacks. The compressor plants are very cumbrous and costly and require being handled with great attention, and they are nevertheless permanently exposed to the danger of explosion whenever the hydrogen to be compressed is contaminated with traces of oxygen. Now this contamination can readily occur at the several packings of the compressors and, inasmuch as the compression in a piston compressor takes place adiabatically, that is under considerable rise of temperature, the temperatures required for an ignition of the gas mixture are always existent.

I avoid these drawbacks according to the present invention by employing in the synthetic process hydrogen produced by the electrolytic decomposition of water in closed pressure resisting vessels, wherein the hydrogen in being set free is placed under the high initial pressure which is required for the synthetic production of ammonia.

The production of hydrogen and oxygen under pressure by electrolytic decomposition of water is old per se, however their electrolytic production under pressure has not yet been employed for the purpose of producing ammonia. By combining these two processes, I obtain a number of important advantages. No outside energy being required for the production of high pressure in the electrolytic vessel, the installation for the production of ammonia is far less expensive as compared with an installation comprising piston compressors, both as first costs, attendance and production of energy are concerned. By utilizing the electrolytic production of hydrogen under pressure, I am further enabled to increase the working pressure of the synthetic installation very considerably above the pressure hitherto employed of about 200 atm. of 1.3 tons per square inch and I can easily obtain initial working pressures above 1000 and up to about 1600 atm., equal to 6.5 and 10 tons per square inch, respectively, whereby the yield of ammonia during each passage of the gases through the catalyzing apparatus is very considerably increased.

I am aware that it has been tried to work under pressure up to about 1000 atm. produced by means of piston compressors. However, such machines are very unreliable and more especially involve the drawback that the gases carry along the oil required for lubrication of the compressor, whereby the action of the catalyst, which is exceedingly sensitive against impurities of all kinds and more especially against oil, is paralyzed.

By utilizing the electrolytic production of hydrogen under pressure in the synthetic production of ammonia this drawback is also avoided. Moreover, the first costs are so low and the operation of the installation is so simple that it works economically even on a small scale, so that even the electric energy produced at night in smaller hydraulic power stations can be utilized for the production of artificial manure.

With electric apparatus such as described further below I can produce practically pure hydrogen under any desired pressure, the process being carried on isothermically, that is without any rise of temperature so that all danger of explosion is avoided, the more so as the quantities of gases present in the electrolytic vessel as well as in the pipes connecting the several parts of the installation are so small that any local ignition of the gas which might arise, will not propagate inasmuch as by contact with the large surfaces of the metal walls of the vessels and pipes the heat is carried off directly at the place of ignition so that the temperature of the adjoining particles of gas cannot be increased to explosion temperature. The nitrogen required for the synthetic production of ammonia is preferably introduced in liquid form. It can be placed under the required pressure without any special means such as compressors, pumps or the like by causing the pressure of the electrolytically produced hydrogen to act on the vessel containing the liquid nitrogen. The liquid nitrogen can be gasified by the heat of the outer air or preferably by mixing it with the hydrogen, which has a higher temperature. I can further utilize the liquid nitrogen for liquefying the ammonia, as it is being produced, the heat inherent in the ammonia being utilized for the gasification of the nitrogen.

Preferably the mixture of hydrogen gas and nitrogen gas under high or preferably maximum pressure passes through a row of catalytically acting contacts arranged in series and which cause the production of ammonia which is separated out between adjoining contacts by washing, by cooling or in some other suitable manner. The pressure existing in the gas mixture falls from one contact to the other in proportion as the gas mixture is consumed in the synthetical process. If the pressure at the last contact is regulated in a suitable manner, for instance by regulating the removal of the ammonia produced, a vigorous operation of the installation and continuous production of ammonia can be obtained by suitably supplying the synthetical installation with fresh gas mixture.

In the drawings affixed to this specification and forming part thereof means for carrying out the process according to the present invention are illustrated by way of example in a purely diagrammatic manner. I wish it to be understood that the means here shown and described are merely designed to illustrate one of a number of possible installations in which my new process can be carried out with advantage, and I do not desire to be limited to any details of construction and combination of part or the whole of this installation, for obvious modifications will occur to a person skilled in the art.

In the drawings

Fig. 1 is a diagram of an entire installation for the synthetic production of ammonia according to the contact process, while

Fig. 3 is a similar view of the vessel or container in which the synthesis of the gases and the production of ammonia is effected.

Figure 2:
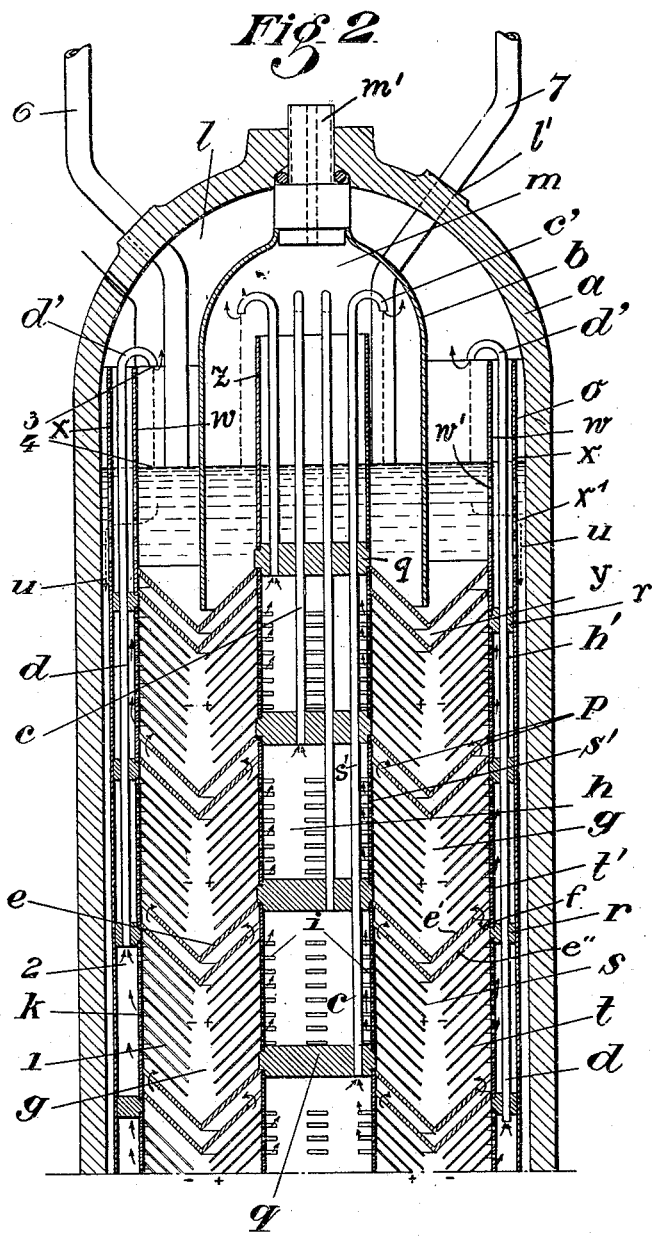
Fig. 2 is a vertical axial section of the electrolytic vessel in which hydrogen is produced under high pressure by decomposition of water.

Referring to the drawings, $a$ is the vessel in which the decomposition of water by electrolysis and the production of hydrogen under pressure is effected. The walls of this vessel are strong enough to resist the highest possible pressure. I may for instance utilize an electrolytic decomposing vessel such as shown in Fig. 2 and which was already shown and described in my copending application for patent Serial No. 743,382 filed October 13, 1924. In the vessel $a$ which may have the form of a gas bottle for high internal pressure, a plurality of annular electrolytic cells $g$ are arranged vertically above one another. The annular cells consist of superimposed units $e$ shown more particularly in Fig. 2 with insulating plates $q$ and insulating rings $r$ inserted between the single units. The positive and negative electrodes $s$ and $t$, respectively, are alternately arranged on cylinders $s'$ and $t'$ which form the inner and outer walls of each unit.

The electrodes $s$ and $t$ are preferably ring-shaped truncated cones arranged one above the other, the upper rims of the cones $s$ being secured to the cylinder $s'$, those of the concentric cones $t$ to the cylinder $t'$. Preferably the inner or lower rims of the electrodes are bent downwards and the electrodes are so arranged that the rim of each upper electrode projects beyond the rim of the electrode below so as to intercept the rising gas bubbles. The rims may also be serrated. Gas ports $i$ and $k$ are formed in the walls $s'$ and $t'$, respectively.

Each cell $g$ is connected with the adjacent cells above and below by conduits $f$ which are formed by walls $e'$, $e''$ in the bottom of each unit $e$. Ports $p$ are formed in these walls, the port in the outer wall $e'$ being on the outside and the port in the inner wall $e''$ being on the inside of the conduit or vice versa, so that the electrolyte is compelled to flow in a long path between two adjacent cells, the free access of the electrolyte from the interior of reservoir $a$ to the several cells being however unobstructed.

The units $e$ are designed with a view to facilitating their assembling. The unit $e$ shown in Fig. 2 comprises two concentric cylinders of different diameter, the upper and wider cylinder being the outer or negative wall $t'$ of one cell, while the lower and narrower cylinder is the inner or positive wall $s'$ of the cell next following in downward direction. In this manner two assembled units form two cells $g$, the two cylinders $s'$ and $t'$ being connected by the walls $e'$ and $e''$ which form the V-shaped conduit $f$. The wall $e'$ forms the bottom of the upper cell, the wall $e''$ forms the cover of the cell below. At the same time, these walls form direct electrical connections between the positive electrodes $s$ and the negative electrodes $t$.

All parts in the reservoir $a$ with the exception of the annular electrodes $s$, $t$ are coated with insulating material. A row of cells $g$ is formed by simply superimposing so many units $e$ and inserting insulators $q$ and $r$ between their cylinders $s'$ and $t'$.

The cells $g$ are surrounded on the outside by a cylindrical shell $x$ perforated at $x'$ and surrounding the insulating rings $r$. A concentric cylinder $w$ perforated at $w'$ and provided with a V-shaped bottom $y$ is placed on the top-most insulating ring $r$.

The units at the upper and lower ends of the series of cells $g$ are connected with the positive and negative terminals of a source of energy, as indicated at $v$ for the negative terminal, the positive terminal being not shown. Current flows between the sets of electrodes $s$ and $t$ in each cell $g$ of the series and oxygen and hydrogen rise between the inclined annular electrodes and escape separately through the ports $i$ and $k$ in the walls $s'$ and $t'$, respectively. These ports are connected with chambers $h$, $h'$, which are defined by the insulators $q$ and $r$, respectively. All the chambers containing the same gas are connected with a separate gas collecting chamber. In the present case, two gas collecting chambers $l$ and $m$ are formed in the pressure receptacle $a$. The topmost insulating disc $q$ is inserted between the top of the smaller cylinder $s'$ and cylinder $z$. Cylinder $z$ is surrounded with a clearance by a bell-shaped partition $b$ which forms the gas collecting chamber $m$ and is suspended from the top of the reservoir $a$ by a perforated plug $m'$ to which a pipe may be connected. The other gas collecting chamber $l$ is formed by the top of the reservoir and connected with a threaded bore $l'$ to which a pipe connection may be secured. The gas chambers $h$ and $h'$ are connected with the collecting chambers by pipes $c$ and $d$, respectively. By conducting the gases to said pipes the buoyancy of the gas bubbles is increased and a more vigorous circulation of the electrolyte is effected so that the danger of the two gases intermixing is greatly reduced. The overlapping downwardly bent inner rims of the electrodes prevent escape of the bubbles formed at the rims of the electrodes into the wrong collecting chamber.

The electrolyte is caused to circulate by the flow of the gases and is carried along with them as a froth as far as the rebends $b'$ and $c'$ of the pipes $c$ and $d$ from which it returns in drops to the body of the electrolyte. Such volume of the electrolyte in the cells which has been transformed into gas is made up by fresh electrolyte from the upper portion of the reservoir $a$. As indicated by the dotted arrow $u$, this fresh electrolyte flows downward along the shell $w$ in the gap $o$ between the shell and the wall of the receptacle $a$ and enters the conduits $f$ from which it passes into the several cells $g$ through the ports $p$. However the electrolyte may also be conducted to each cell by separate pipes.

The current, instead of following the normal path as described, might have a tendency of flowing from the negative terminals of one cell to the positive electrodes of the adjacent cell through the electrolyte, not through the electrodes. This is rendered impossible because the electrolyte in separate cells is connected by way of the conduits $f$ along the walls $e'$ and $e''$ which are of equal potential. The path from the terminal of any one cell through the respective gas pipe and the froth of electrolyte rising in the pipe with the gas bubbles and dripping into the electrolyte at the top of the reservoir as shown by the numerals 1, 2, 3, 4 is so long and its ohmic resistance is so considerable that loss of current arising from this cause is practically excluded.

Practically the only path on which current can flow is the normal path between the electrodes $s$, $t$ of the series of cells.

Figure 1:
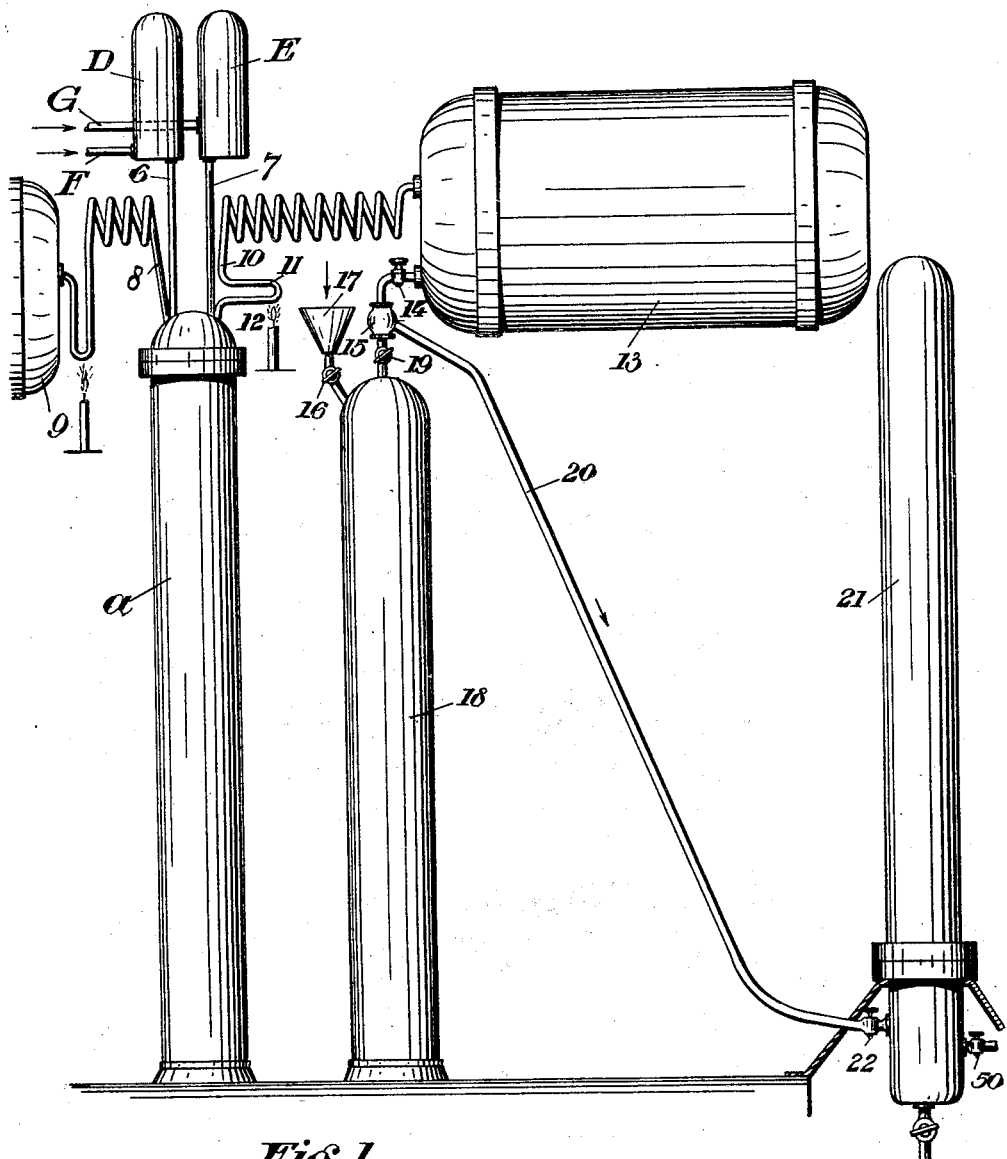

The electrolyte is preferably fed into the electrolytic vessel, as shown in Fig. 1, separately for each gas collecting chamber $l$ and $m$ respectively by arranging above the vessel two cylinders D, E which are supplied with electrolyte by means of pipes F and G, respectively. The cylinders are connected by a pipe 6 and 7, respectively, at the respective gas collecting chamber of the respective vessel. The upper ends of the pipes 6 and 7 are disposed near the bottom of the cylinders D, E, while their lower ends are about flush with the electrolyte level. In this manner not only the level of the electrolyte is regulated automatically, but the separate supply of electrolyte to the two gas collecting chambers excludes the danger of the gases mixing by diffusion or the like, so that the gases developed in the electrolytic vessel are practically pure. The gas collecting chambers $l$ and $m$ are so small that even in case that the hydrogen should be contaminated by oxygen and the temperature of ignition should be reached or a spark should arise, no explosion can take place, because the heat arising in consequence of such partial ignition would at once be carried off by the walls of the vessel and by the gas which under the high pressure has a high heat conductivity.

The oxygen developed in the electrolytic vessel is conducted through pipe 8 into the oxygen collector 9 to be utilized for any suitable purpose. The hydrogen leaves the electrolytic vessel in a state of high purity through a thin long pipe 10 which is kept at some suitable point, such as 11 at the temperature of ignition of a mixture of hydrogen and oxygen (above 400° C.) by means of a burner 12 or by electric means. I may however also dispose within the pipe a catalyst such as platinum black. Any residual oxygen which might still be present in the hydrogen passing through pipe 10 is oxidized to water at 11 without the heat formed by such oxidation being communicated to the adjoining particles of gas, inasmuch as it is at once carried away by the walls of pipe 10. The water produced by combustion drips back into the electrolytic vessel a. In this manner entirely pure gas is collected in the hydrogen reservoirs one of which is shown at 13.

From these reservoirs the hydrogen, after passing through a valve 14, is conducted to a mixing nozzle 15 where nitrogen is admixed in the desired proportion. The nitrogen is for instance filled in liquid condition into steel cylinders 18 having openings 17 closed by suitable valves 16. In proportion to the surface area of the cylinder the nitrogen is heated by the outer air, but other means for heating the liquid nitrogen, for instance by means of the hydrogen, can be provided. The nitrogen gas escapes through the valve 19 into the mixing nozzle 15, from which the mixture of hydrogen and nitrogen is conducted to the synthetic vessel 21 through a pipe 20 and valve 22.

The synthetic vessel 21 (Fig. 3) encloses a number of concentric sheet metal cylinders 23, 24, 25, 26, 27 spaced apart by means of rings 28 at the bottom. These cylinders, with the exception of the outermost cylinder 27 are flared near the upper end at 30, whereby their inner diameter is somewhat greater at the upper ends. Into this upper portion of each cylinder a short cylinder 51, 52, 53, 54, 55 is inserted having about the same diameter as the lower portion of the respective cylinder 23, 24, 25, 26, 27. Owing to the upper parts of the long cylinder being flared, there is left between the short cylinders 51 . . . and the inner walls of the long cylinders 23 . . . an annular space, the only exception being the outermost cylinder 55 which is directly applied against the inner wall of the outermost cylinder 27. Each cylinder, with the exception of the central cylinder 51, is spaced apart from the adjoining cylinder by means of an annular cover 29 so that all the cylinders with the exception of the central one are closed on top. Within the central cylinder 51 and in the annular spaces confined between the other cylinders 52, 53 . . . and the cylinders 23, 24 . . ., which adjoin them towards the centre, the catalyst or contact material 31 is disposed which preferably has the form of discs. The central cylinder 51 is closed by a disc-shaped bottom 32', the other cylinders 52, 53 . . . by annular bottoms 32. All these bottoms are provided with a great number of perforations in which are inserted thin tubes 33, being tightly connected with the bottoms by rolling and being spaced apart from each other. The tubes 33 extend downwards through the vessel 21 in the spaces enclosed between the cylinders 23 . . . 27 and their lower ends are preferably inserted in a bottom 34 corresponding to the bottom 32 and slightly spaced apart from the bottom 28. I may however also dispose these tubes with their lower ends freely hanging in the vessel 21. Outside the outermost cylinder 27 there is left an annular space 35 in which rises the mixture of hydrogen and nitrogen which is supplied into the bottom portion of vessel 21 through pipe 20. Between this annular space 35 and the wall of the vessel 21 is inserted a heat insulating layer 36 of glass wool or the like.

The nitrogen in the mixture of gases introduced through pipe 20 having a very low temperature, at first the bottom portion of the vessel 21 will be cooled down. If desired, a chamber 38 can be provided below the bottom 37, which may also be filled with liquid nitrogen, which is gasified and admixed to the mixture of hydrogen and nitrogen through the channel 39 comprising a suitable valve 70. The mixture which rises in the annular space 35, while cooling the walls of the pressure resisting vessel 21, flows across the covers 29 into the central cylinder 51 which is open on top. In the catalytic material 31 disposed in this cylinder is arranged a spiral heating wire 40 which serves for heating this material when starting the operation. After operation has once been started, the synthetical process itself develops sufficient heat at the points of contact (catalytic material) 31 so that this material is automatically and permanently maintained on the high temperature required in the synthetical process.

After passing through the catalytic material disposed in the central cylinder the ammonia gas here formed descends together with the residual mixture of nitrogen and hydrogen through the thin tubes 33, the thin walls of which conduct the heat of the gases to the outside. In the cold bottom portion of the cylinder 23 the heavy ammonia separates from the gases and is liquefied. The ammonia can be tapped off through an opening 41 in the central bottom 39 into the ammonia collecting vessel 42. The cool gas mixture flows around the bottom edges of the lower ends of the tubes 33 into the spaces intermediate the tubes and in rising between the tubes 33 takes up heat from the mixture descending in the tubes. Thereafter the rising mixture, on arriving in the top portion of the vessel 21, has almost reached the high temperature to which the mixture is heated on leaving the catalyst. At the point 30, where the cylinder is flared, the mixture rises into the annular space 43 intermediate the cylinder 23 and the cylinder 51 containing the central catalyst 31 and in descending again enters the catalyst disposed in the cylinder 52. Another part of the mixture is converted into ammonia which descends together with the remaining gas mixture through the bundle of tubes 33 arranged in the cylinder 24. In the cold bottom portion of cylinder 24 this ammonia is liquefied and separated from the gas to drip through a bottom opening 45 into the ammonia collecting vessel 42. The remaining gases now rise in the spaces between the tubes 33 disposed in cylinder 24 and so on. The bottoms of the other cylinders 25, 26 and 27 arranged in the cold part of the vessel are also provided with openings 46, 47, 48 for tapping off the ammonia, all these openings being provided with suitable valves (not shown).

In order to start operation in this installation, the hydrogen collecting vessels 13 can be filled with hydrogen up to a pressure of about 400 atm. (2.6 tons per square inch) or, if desired, up to a pressure of 1000 atm. or more. The nitrogen containers 18 or 38 or both are filled with liquid nitrogen and are placed under the same pressure as the hydrogen by setting the respective valves. By cutting in the spiral heating wire 40 the first contact 31 in cylinder 51 is heated. When a temperature of 500–700° C. is obtained at the contacts, some gas or some liquid ammonia which may still be present in the chamber 42 from a preceding operation, is tapped off through the controllable conduit 44, thereby generating a flow of gas, whereby the gases, in passing through the catalysts 31, form ammonia which is then separated out in the cold bottom zone of the vessel.

This bottom zone is permanently cooled by the cold nitrogen. The top portion containing the contacts 31 is permanently maintained at the high temperature required for the synthesis, inasmuch as the synthetic process itself produces the heat required for permanently heating the contacts 31. On the other hand, the current of cold fresh gases in the annular space 35 surrounding the inner part of the apparatus together with the insulating layer 36 act towards keeping also the top portion of the apparatus at a low temperature. If necessary, the walls might be cooled with water.

In consequence of the gases being combined to form ammonia, which is separated out as a liquid, the pressure in the installation would be liable to permanently decrease in proportion. However, if fresh hydrogen is developed in the electrolytic vessel $a$ in the same proportion, the pressure in the collecting vessels 13 can be permanently maintained substantially on the same level, while the pressure in the synthetic vessel 21 is permanently as much lower as is necessary in order to maintain a flow of gases and the formation of ammonia. This flow of gases is the more vigorous the greater the number of contacts 31 which are traversed in series by the mixture of gases, inasmuch as at each contact part of the gas mixture disappears in the form of ammonia.

The flow of gases can further be rendered vigorous and the efficiency of the installation can be increased correspondingly by working at the highest initial pressure, for in proportion to the pressure also the yield, i. e. the percentage of gases converted into ammonia at each contact, increases. In view of the fact that by developing the hydrogen electrolytically under pressure the highest pressure can be obtained without any expense of energy, it is very advantageous to work at the highest possible initial pressure. The quantity of residual gases which, after passing through catalytic material 31, has not been converted into ammonia decreases the more the higher the pressure. The great diminution of pressure also increases the velocity of flow and in consequence thereof the yield obtainable.

The residual gas which has not been converted into ammonia, after passing through the last contact material, is allowed to escape from the cold bottom chamber 49 through a pipe 50. It can be condensed by the pressure produced in the electrolytic cell and can then be added again to the fresh gas mixture.

I wish it to be understood that I do not desire to be limited to any detail or sequence of operation nor to any figures herein before stated, for obvious modifications will occur to a person skilled in the art.

I claim:—

1. Apparatus for synthetic production of ammonia from hydrogen and nitrogen comprising a closed, pressure resisting electrolytic vessel for the production of hydrogen under pressure, a hydrogen collecting vessel connected with the hydrogen collecting chamber of said electrolytic vessel, heating means inserted between the two vessels for causing combination of traces of oxygen with hydrogen, means for mixing the hydrogen under the pressure aforesaid with nitrogen and means for conducting the mixture of hydrogen and nitrogen past catalytic material.

2. Apparatus for synthetic production of ammonia from hydrogen and nitrogen comprising a closed, pressure resisting electrolytic vessel for the production of hydrogen under pressure, a hydrogen collecting vessel connected with the hydrogen collecting chamber of said electrolytic vessel, heating means inserted between the two vessels for causing combination of traces of oxygen with hydrogen, means for mixing the hydrogen under the pressure aforesaid with nitrogen and a pressure resistive vessel for the synthetic production of ammonia from the mixture of hydrogen and nitrogen.

3. Apparatus for the synthetic production of ammonia from hydrogen and nitrogen comprising a closed, pressure resisting electrolytic vessel for the production of hydrogen under pressure, a hydrogen collecting vessel connected with the hydrogen collecting chamber of said electrolytic vessel, heating means inserted between the two vessels for causing combination of traces of oxygen with hydrogen, means for mixing the hydrogen under the pressure aforesaid with nitrogen, a pressure resistive vessel for the synthetic production of ammonia from the mixture of hydrogen and nitrogen, a number of catalytic contacts in the synthetic vessel and means in said vessel for causing the mixture of hydrogen and nitrogen to travel past one after the other of said contacts.

4. Apparatus for the synthetic production of ammonia from hydrogen and nitrogen comprising a synthetic vessel, a plurality of concentric cylinders in said vessel, a catalyst in each cylinder and means for causing a plurality of gases supplied into the vessel to travel through the cylinders in series and in opposite directions to react with each other in contact with said catalysts.

5. Apparatus for the synthetic production of ammonia from hydrogen and nitrogen comprising a synthetic vessel, a plurality of concentric cylinders extending through said vessel and a plurality of shorter concentric cylinders of different diameters superimposed to and extending into the spaces between the first cylinders so as to form intercommunicating passages for directing gases sequentially through the respective cylinders.

6. Apparatus for the synthetic production of ammonia from hydrogen and nitrogen comprising a synthetic vessel, a plurality of concentric cylinders extending through said vessel, a plurality of shorter concentric cylinders of different diameters superimposed to and extending into the spaces between the first cylinders so as to form intercommunicating passages for directing gases sequentially through the respective cylinders and catalytic material arranged intermediate the short and the long cylinders.

7. Apparatus for the synthetic production of ammonia from hydrogen and nitrogen comprising a synthetic vessel, a plurality of concentric cylinders extending through said vessel, a plurality of shorter concentric cylinders of different diameters to superimposed to and extending into the spaces between the first cylinders so as to form intercommunicating passages for directing gases sequentially through the respective cylinders, catalytic material arranged intermediate the short and the long cylinders and a system of tubes extending in the annular space intermediate adjoining long cylinders.

8. The art of synthetically producing ammonia by catalytic action which comprises electrolytically decomposing water in a closed vessel to obtain hydrogen under pressure sufficient for effective catalytic action, admixing nitrogen therewith and expanding said mixture, and subjecting the resulting cold admixture in heat exchange relation to products of catalysis and to catalytic action under the said generated pressure.

9. The art of synthetically producing ammonia by catalytic action which comprises electrolytically decomposing water in a closed vessel to obtain hydrogen under pressures above one thousand atmospheres, admixing nitrogen therewith and expanding said mixture, and subjecting the resulting cold admixture in heat exchange relation to products of catalysis and to catalytic action under the said generated pressure.

10. The art of synthetically producing ammonia by catalytic action which comprises electrolytically decomposing water in a closed vessel to obtain hydrogen under pressure sufficient for effective catalytic action, admixing nitrogen therewith and expanding said mixture, subjecting the resulting cold admixture in heat exchange relation to products of catalysis and to catalytic action under the said generated pressure, and liquefying the nitrogen by the generated hydrogen pressure.

11. The art of synthetically producing ammonia by catalytic action which comprises electrolytically decomposing water in a closed vessel to obtain hydrogen under pressure sufficient for effective catalytic action, admixing nitrogen therewith, subjecting the resulting cold admixture in heat exchange relation to products of catalysis and to catalytic action to produce ammonia gas, and liquefying the gas by the expansion of liquid nitrogen.

12. The art of synthetically producing ammonia by catalytic action which comprises electrolytically decomposing water in a closed vessel to obtain hydrogen under pressure sufficient for effective catalytic action, admixing the hydrogen with liquid nitrogen and expanding said mixture to gasify the said nitrogen and cool the hydrogen, and subjecting the admixture of hydrogen and nitrogen in heat exchange relation to products of catalysis to catalytic action under the said generated pressure.

13. The art of synthetically producing ammonia by catalytic action which comprises electrolytically decomposing water in a closed vessel to obtain hydrogen under pressure sufficient for effective catalytic action, removing traces of oxygen from the generated hydrogen by oxidation, admixing nitrogen therewith and expanding, and subjecting the resulting cold admixture in heat exchange relation to products of catalysis and to catalytic action under the said generated pressure.

14. The art of synthetically producing ammonia by catalytic action which comprises electrolytically decomposing water in a closed vessel to obtain hydrogen under pressure sufficient for effective catalytic action, gasifying liquid nitrogen by reduction in pressure, mixing the hydrogen and nitrogen gases in a mixing nozzle, and subjecting the resulting cold admixture in heat exchange relation to products of catalysis and to catalytic action under the said generated pressure.

15. The art of synthetically producing ammonia by catalytic action which comprises electrolytically decomposing water in a closed vessel to obtain hydrogen under pressure sufficient for effective catalytic action, admixing nitrogen therewith and reducing said pressure, conducting the hydrogen and nitrogen gases past a catalyst, separating therefrom the ammonia formed, and conducting the residual gases past a second catalyst without previous compression.

16. The art of synthetically producing ammonia by catalytic action which comprises electrolytically decomposing water in a closed vessel to obtain hydrogen under pressure sufficient for effective catalytic action, admixing nitrogen therewith and expanding, subjecting the mixture to a plurality of catalysts in sequential stages, and removing the ammonia formed between each of the stages.

17. The art of synthetically producing ammonia by catalytic action which comprises electrolytically decomposing water in a closed vessel to obtain hydrogen under pressure sufficient for effective catalytic action, admixing nitrogen therewith and expanding, subjecting the mixture to a plurality of catalysts in sequential stages, separating out the ammonia formed between each of the stages, and liquefying and drawing off the ammonia thus produced.

In testimony whereof I affix my signature.

FRANZ LAWACZECK.